US 6,560,234 B1

(12) United States Patent
Ben-Michael et al.

(10) Patent No.: US 6,560,234 B1
(45) Date of Patent: May 6, 2003

(54) UNIVERSAL PREMISES DISTRIBUTION PLATFORM

(75) Inventors: Rafael Ben-Michael, Scotch Plains, NJ (US); Robert Bennett, Brick, NJ (US); Theodore P. Jamer, Union, NJ (US); Anatoly A Tsaliovich, East Brunswick, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/301,875

(22) Filed: Apr. 29, 1999

Related U.S. Application Data

(60) Provisional application No. 60/124,921, filed on Mar. 17, 1999.

(51) Int. Cl.[7] ............................................. H04L 12/66
(52) U.S. Cl. ...................... 370/401; 370/466; 370/463; 370/902; 379/88.14; 375/220; 340/310.01; 709/249; 709/250; 709/311
(58) Field of Search ................... 370/401, 465, 370/466, 463, 402, 467, 902, 328, 310, 310.1, 352, 351, 353, 354, 389; 375/219, 220, 222; 379/88.13, 88.14; 709/249, 250, 310, 311; 340/310.01

(56) References Cited

U.S. PATENT DOCUMENTS

| | | | | | |
|---|---|---|---|---|---|
| 5,828,666 A | * | 10/1998 | Focsaneanu et al. | ........ | 370/389 |
| 6,208,637 B1 | * | 3/2001 | Eames | .......................... | 370/352 |
| 6,229,810 B1 | * | 5/2001 | Gerszberg et al. | .......... | 370/401 |
| 6,317,884 B1 | * | 11/2001 | Eames et al. | .................. | 725/78 |

* cited by examiner

Primary Examiner—Dang Ton
(74) Attorney, Agent, or Firm—Potomac Patent Group, PLLC

(57) ABSTRACT

A new communication distribution platform for a customer premise creates a new paradigm where components from the physical layer are shared, components from the MAC layer are shared, and a common network layer is used. A single modulation unified system and shared MAC is used across multiple media. Varied implementations may chose to share only physical layer components, or MAC layer components, or both. One implementation disclosed is the use of a common physical layer modulation combined with a MAC layer with many common functions in support of delivery of IP based services within the premises. This combination optimizes customer experience, flexibility in use, provides simpler maintenance, and simpler reduced inventory requirements and operations support for service suppliers. It can be used to support either a circuit switched environment or packet switched environment.

20 Claims, 3 Drawing Sheets

FIG. 1

CUSTOMER PREMISE WITH UNIVERSAL DISTRIBUTION PLATFORM

APPLICATIONS: TELEPHONY, DATA, VIDEO

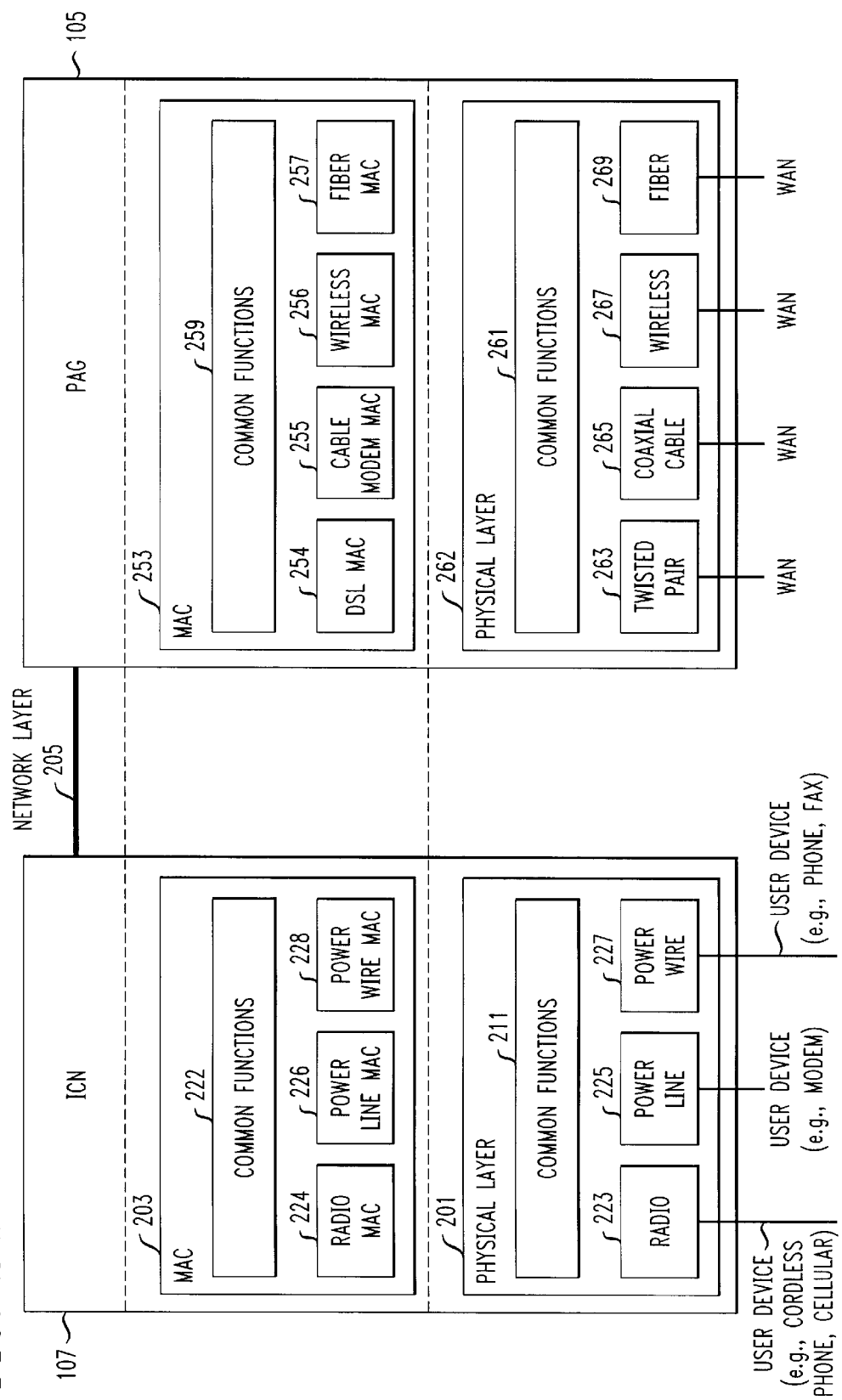
FIG. 2 PAG AND ICN EMBODIMENT

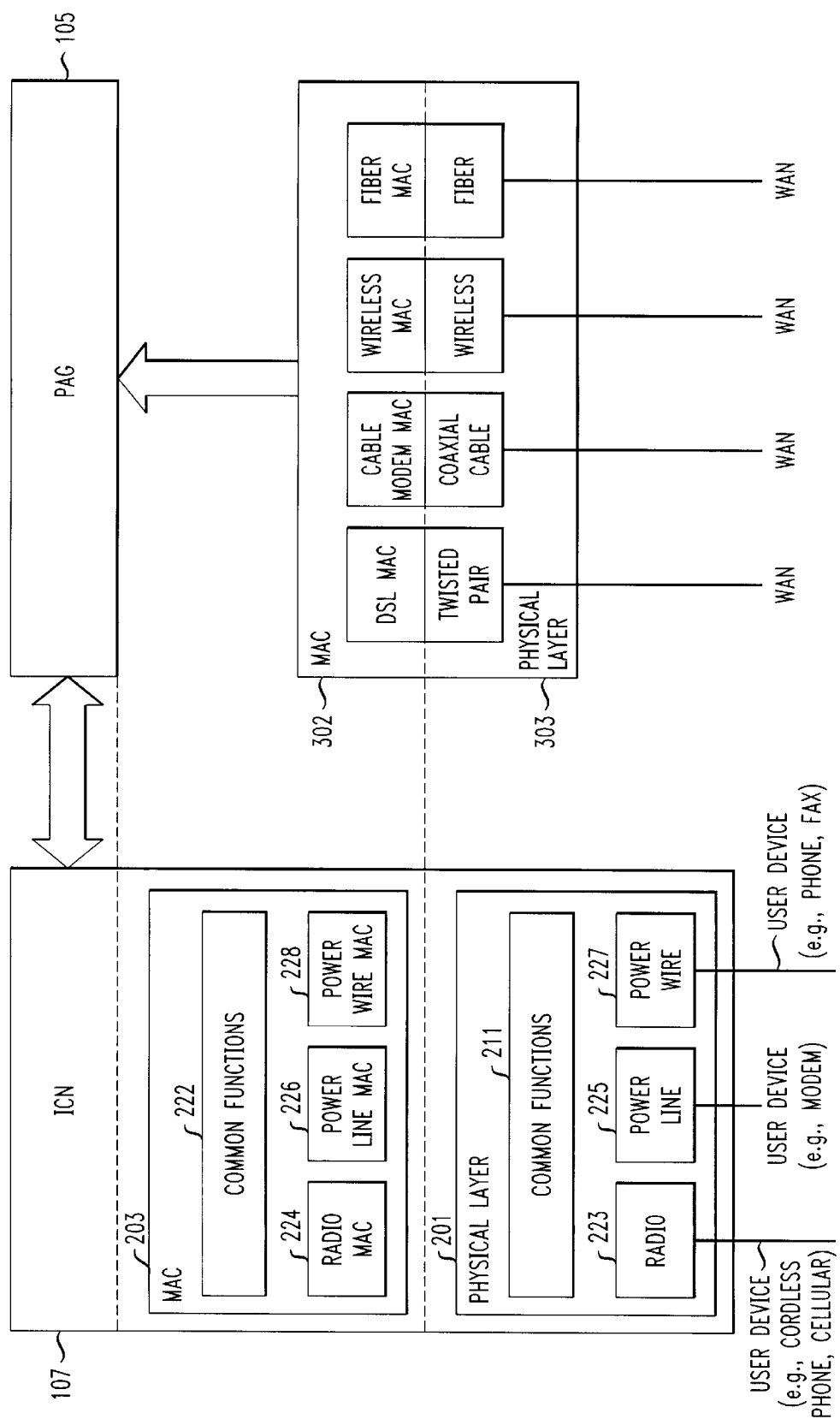
FIG. 3 PREFERRED NEAR TERM INVENTION EMBODIMENT

UNIVERSAL PREMISES DISTRIBUTION PLATFORM

This application the benefit of Ser. No. 60/124,921, filed Mar. 17, 1999.

FIELD OF THE INVENTION

This invention relates to a consolidated universal platform for distribution of communication services via an In-Premises Communication Node (ICN). It also concerns a premises located consolidated universal platform containing one or more ICN devices and connecting to a Wide Area Network via a Premises Adaptive Gateway (PAG). It is specifically concerned with integrating hardware and functions and leveraging common elements and functions across multiple physical media and across MAC and Network functions. This integration minimizes the difficulties of using multiple media to distribute voice, data & video signals in the home. It is also concerned with the ability to use common elements across MAC and Network functions for a simplified implementation of in premise networks such as Internet Protocol.

BACKGROUND OF THE INVENTION

The variety of services provided by telecommunication networks is increasing as is the methods of delivery of these services. The two are interrelated and frequently the method of delivery is important to the desirability, quality or efficiency of the service. For example, wireless or cordless may be preferable to phone wire or the in house electrical wiring preferred for the distribution of telephone services within customer premises. Each of these alternatives is preferable in certain situations and not so preferable in others.

It is desirable to have all of these alternative methods of delivery available to and within the customer premises to provide the highest quality and greatest flexibility in any selected service, or to permit achievement of a desired economy. Such provision of alternatives of network and premise links is expensive when multiple methods were used since the various alternatives substantially operate traditionally in exclusion with one another, even though their individual functions often overlap. This overlap occurs at multiple layers: physical, MAC, and network.

At the physical level, prior state of the art led to technology that was optimized for a specific media. Hence each service provided to the customer premises required different media interface equipment dedicated to that particular media. This resulted in multiple systems and multiple pieces of specialized equipment to provide the multiple services. For service providers, this requires inventory being dedicated to each individual media.

At the MAC and network layers, different implementations were used which did not foster a sharing of common functional modules. Similarly, prior art used a MAC and Network layer that was optimized for a single transport media. This did not foster functional module sharing so that each physical layer implementation had its own individual MAC, and often its own network layer.

A customer premise is provided with a variety of services and modes of communication links/channels or circuits so that pluralities of these are available for use. For example, given a variety of telecommunications services and a variety of customers provided equipment, each customer premises has used different distribution media specific to an application. This would include coaxial cable for television signal distribution, telephony wire for voice and fax distribution, wireless/cordless for voice and low speed data distribution, power wires for electrical energy distribution, and structured wire for data distribution. This invention unifies these previously disparate and independent distribution media into a coherent local area network capable of supporting voice, data, and video applications with a plurality of physical connections to consumer devices.

SUMMARY OF THE INVENTION

A new communication distribution platform for a customer premise, embodying the principles of the invention, creates a new paradigm where components from the physical layer are shared, components from the MAC layer are shared, and a common network layer is used. A single modulation unified system and shared MAC, in accord with the invention, is used across multiple media. Varied implementations of the invention may choose to share only physical layer components, or MAC layer components, or both. A preferred implementation may be the use of a common physical layer modulation combined with a MAC layer with many common functions in support of delivery of IP based services within the premises. Compared to the prior state of the art, this invention optimizes customer experience, flexibility in use, provides simpler maintenance, and simpler reduced inventory requirements and operations support for service suppliers. This invention can be used to support either a circuit switched environment or packet switched environment.

Prior art distribution systems required optimization of the physical layer through a modulation scheme optimized for a specific media. Similarly, each MAC layer was developed for a specific media as well. This present invention is also concerned with the sharing of common functions within a MAC for multiple media, and/or the sharing of common functions within a Physical Layer. This sharing is utilized to simplify the component distribution and service distribution and its maintenance. This leads to an optimized customer and supplier experience—especially for the preferred implementation of Internet Protocol within the premises across multiple media.

At the physical layer, this invention combines distinct physical interfaces into a single function group. This allows unification of many MAC and all network layer functions. It efficiently combines common functions across disparate media and couples these functions to the various communication links/channels or circuits. In particular a plurality of in premise media connected to various in premise communication devices is coupled to a plurality of access media, which is connected to a wide area network (WAN). It also is possible, in accord with the invention, to create a single MAC without physical layer integration as well, so that common functions can be shared. It is possible to create a MAC with a physical media lower layer that shares common upper layer functions. Unification of upper layer MAC functions enables a single network layer.

The logical LAN, created according to the invention, now needs to be connected to a Wide Area Network capable of supporting the combined bandwidth demands of these applications. This does not preclude the use of multiple narrow band network connections to meet the WAN bandwidth demands. Therefore, this can be supported with a plurality of narrow band networks for connection to the premises. An In-Premises Communications Node (ICN) provides connection to the LAN. Connection to the WAN is provided by a Premises Adaptive Gateway (PAG) in combination with an ICN.

A particular In-premises Communication Node (ICN) embodiment includes a media access control (MAC) providing media specific controls partitioned into common functions and media specific functions and controls. Similarly, the physical layer combines common functions such as synchronization, signaling and/or modulation, suitable for varied in-premise distribution media and media specific access for various access media such as power lines, phone lines, and wireless/cordless links through separate functional modules. Also, the physical layer provides hardware connections and media specific front-end hardware interfaces, individually or in combinations. These are provided for the physical link connections to the distribution media, such as power line, phone wire, coaxial cable, structure wire, and RF connections. Other implementations may include fiber and free space infrared media.

A preferred embodiment of this unified physical layer modulation uses Orthogonal Frequency Division Multiplexing (OFDM) for the shared modulation function in the physical layer. OFDM is well known to those skilled in the art. U.S. Pat. No. 3,488,445 covering a pioneering form of OFDM was issued Jan. 6, 1970 for example. OFDM spaces multiple functions in the physical carriers close together (i.e., narrow guard bands) so that the side bands overlap but utilize carrier waves so that adjacent channels are orthogonal and do not interfere with one another. Other multiplexing embodiments however are also advantageous for the unified physical layer. Other methods include using Direct Sequence Spread Spectrum, Discrete Multi-Tone, and Carrierless Amplitude Phase (CAP) modulation. These schemes of modulation are well known to those skilled in the art and their particular embodiments need not be discussed in detail herein.

The ICN connects to the WAN through a Premises Adaptive Gateway (PAG) which provides a common network layer. In the MAC layer, common shared functions and media specific controls are performed. At the physical layer common shared functions such as modulation, signaling, synchronization and media independent functions can be combined and connected to the WAN through media dependent front-end interfaces such as twisted pair, coaxial cable, fiber cable, and wireless modules. This technology is appropriate for and can interface with circuit switched networks, packet switched networks and cell switched networks. For example, one embodiment of this would construct the PAG as a protocol conversion and mapping (inter-working) via a MAC and physical layer interface specific to a single WAN technology, such as CATV coaxial cable.

A network layer is provided which is common both the PAG and the ICN. This network layer unifies the in premise distribution and the WAN adaptive network connection. This is not the preferred near term embodiment but may be the long-term embodiment as WAN technologies continue to develop and mature.

While specific media details are described herein, it is to be understood that these are only illustrative and that the invention is applicable to other media arrangements, both in the WAN and in the premises LAN.

Specific advantages of this invention are many. Less product inventory as a supplier is needed because only one product or element is needed to serve many functions. This distribution platform delivers an in-premise multi-media LAN that interfaces to telephony products including cordless phones, personal computers, computer peripherals such as printers, and audio/visual products such as televisions. This product could also interface with intelligent home devices for control in the future.

The use of common implementations of the physical modulation, MAC, and network layers allow for a single logical unit which is supportable with a single set of operations and telemetry control functions and interfaces. (This applies even if the implementation occurs at only the physical layer, or the MAC layer, or in combination of the physical layer and MAC layer.) Unification also provides for economies of scale for unit and chip production. For example, a single ICN device with couplers to power wire and telephone wire would share most of the physical layer and all the MAC and network layer components including media specific inventory.

BRIEF DESCRIPTION OF THE DRAWING

FIG. 1 shows a schematic of a customer premise including a distribution platform conforming to the conceptual elements of the invention;

FIG. 2 shows an illustrative embodiment of the PAG and ICN elements according to the invention; and FIG. 3 shows an alternative embodiment of the invention.

DETAILED DESCRIPTION

A WAN connecting a global communications network to the customer premises 100 is shown in the schematic of FIG. 1. Illustrative different access media for the WAN connectivity, is represented in FIG. 1 as four dashed lines 101-N connecting the WAN 103 to a PAG 105. These WAN access media embodiments may include a coaxial cable with a cable modem, telephony wires with Digital Subscriber Line (DSL) modems, fixed wireless modems, and fiber optic cable and terminal equipment. These media interfaces are included in one adaptive gateway device (Shown in FIGS. 2 and 3) that provides an appropriate WAN interface. (Narrow band media may also be used separately or in combination as well, depending on bandwidth availability and requirements.)

The Premises Adaptive Gateway (PAG) 105 connects to the in home LAN, via communication links 109 as facilitated by the In Premises Communication node (ICN) 107 effectively connecting the in-home LAN to the WAN 103. The ICN/PAG combination accommodates a plurality of media technology. The premises 100 may have more than one ICNs (111 and 113) connected to the PAG 105 as desired by the customer.

A similar set of disparate media, mirroring the WAN exists inside the customer premises. In one example typical in-premises media may include telephony wires, electrical wires, radio frequency (wireless), and structured wire such as CAT 3 or CAT 5 (i.e., an indication of cable capacity) home coaxial cable, in home fiber optics, or free space infrared -represented as the white cloud in FIG. 1. The In Premises Communication Node (ICN) 107 interface connects customer equipment such as telephones, fax machines, PCs, and TVs (i.e., the Customer applications and related consumer devices) to the one or more of physical media— singly or in combination, and ultimately to the WAN 103 via the Premises Adaptive Gateway (PAG) 105.

The ICN 107 and PAG 105 functions or physical devices may, in one embodiment of the invention, be housed in a single unit called the Universal Distribution Platform in a preferred solution. The ICN function of that unit would connect to one or more physical media—possibly using multiple ICN devices that have different physical couplers but sharing portions or entireties of the physical layer, MAC layer, and network layer implementations.

Premises power lines, which may be used as a telephone communication link, are not optimized for voice and data telephone communications. It a very challenging media to use for communications having any degree of quality. One resolution of this challenge has been to use OFDM as a modulation scheme. OFDM (i.e., Orthogonal Frequency Division Multiplexing) was optimized initially for poor quality power line channels, but due to the significant problems associated with that media, this modulation scheme was found to be very advantageous for that application and for other media applications. Specific characteristics of OFDM when applied to power line communication technologies include providing immunity to high levels of noise and interference, providing immunity to multiple reflections, providing capability to work over time varying transfer functions, and meeting EMC (Electro-Magnetic Compatibility) requirements.

Specific to the preferred embodiment, a generically available OFDM is applied, in common, to all the available media through appropriate hardware interfaces using separate front end connectors and couplers for connection to media such as power line or telephony wire in the home. Techniques other than OFDM, such as direct sequence spread spectrum, are also useful for communications over low quality transmission media, and have also been successfully demonstrated.

The ICN 107 and PAG 105 work in combination to provide multiple services with combined or shared functions and equipment. As shown in FIG. 2, the ICN connects premises equipment and applications such as phones, fax machines, cable modems, wireless phones (e.g., cordless, cellular) to a common in-premises LAN ( includes links 109). This LAN is also the interface via links 109 (FIG. 1) for connection to the Premises Adaptive Gateway (PAG) 105 and WAN 103. The ICN 107 is a function stack, as well as a physical device, that can be separated into three major layers: A Physical Layer 201, a MAC Layer 203, and a Network Layer 205. The physical layer 201 is partitioned into two distinct interacting functions—media independent common functions 211 such as modulation and media specific front-end interfaces (i.e., signal couplers) such as radio 223, power line 225, and telephony wire couplers 227 in the home. These signal couples connect to different communication devices used in the premise and are dependent upon the service provided. The MAC layer 203 (i.e., data link, OSI layer 2) is partitioned in a similar manner. Common MAC layer 222 includes common functions related to a common modulation and media specific processing units', radio MAC 224, power line MAC 226 and phone wire MAC 228. These processing units supplement the common modulation to accommodate certain specifics of media specific physical layer attributes.

The network layer 205-N is common to both the PAG 105 and ICN 107. This network structure enables sharing of similar functions within the PAG while providing a single interface for applications.

PAG 105 includes a MAC layer 253 which is similar to the ICN MAC layer with a media specific portion having functions such a DSL (Digital Subscriber Loop) MAC 254, a cable modem MAC 255, a wireless MAC 256 and a fiber MAC 257. Common MAC functions are included in a common MAC 259.

A possible PAG implementation with a single interface technology may be implemented for telephone wire with DSL. A suitable DSL MAC embodiment for application herein is described in a U.S. patent application by Jen-Ming Ho having Ser. No. 09/222878 and filing date Oct. 2, 1998 and in U.S. Pat. No. 5,570,335 who's teachings are incorporated herein by reference. Other MACs, suitable for application are well known to those skilled in the art and need not be disclosed in detail herein. These existing MACs are combined to process multiple media. In this way, integration can occur at a lower layer and facilitate use of a common network layer without additional work or conversion.

As shown in FIG. 2, the PAG 105 can also be viewed as a function stack with the physical layer partitioned into two functions types-media independent common functions such as synchronization, signaling and/or modulation and media specific front-end interfaces such as twisted pair, coaxial cable, fiber and/or radio transmission. Functionality is combined to perform common modulation, while interfacing to a common higher level MAC 253 and network layers 205-2.

The physical layer 262 is partitioned into two functions—a common layer 261 and physical layer having media dependent couplers to the WAN such as twisted pair 263, coaxial cable 265, wireless 267 and fiber 269. This portion of the physical layer already exists in current products and need not be discussed in detail. The MAC layer 253 is also partitioned into two functions—a common layer 259 and dependent MAC sub units; DSL MAC 254, Cable Modem MAC 255, Wireless MAC 256 and a fiber MAC 257.

Network layers for the ICN 205-1 and for the PAG 205-2 (i.e. packet layer, OSI layer 3) are integrated to combine a common network for the ICN and PAG.

A variation of the ICN/PAG is illustrated in the schematic of FIG. 3. This recognizes the large consolidated base of media specific WAN protocols and related hardware and software including MACs, and reflects the near term preferred embodiment of interfacing with a single WAN technology. The schematic of FIG. 3 illustrates the use of cable modem technology, but DSL or wireless is also possible near term embodiments.

The distribution system of FIG. 3 integrates a high layer protocol conversion function and network layer interworking functions to provide an interface to the global WAN for the ICN. The packet processing is adapted to provide the common modulation function. The protocol conversion and interworking functions shown in block 301 are specific to cable modem and coaxial cable. As a result, the network layer, MAC and partitioned physical layer of the WAN Adaptive Gateway is functionally linked to the ICN. The network layer could then be shared across the in-premise's distribution LAN and the WAN access.

Inter-working between the ICN network layer 205 and the WAN is provided by a WAN specific protocol conversion and mapping (inter-working) block 301 and a WAN specific MAC 302 and physical layer 303. This inter-working is well understood and is similar to the inter-working commonly provided when crossing between Ethernet networks, T-1 access facilities, and ATM transport facilities.

What is claimed is:

1. A distribution system for providing a customer premises with a unified multiple media telecommunications distribution platform, comprising:

an in-premises communication node (ICN) including a media access control (MAC) layer and a physical connection layer wherein the MAC layer includes media specific controls and media specific functions combined as a common functional unit and the physical connection layer includes a common connection layer providing a common synchronization, modulation, multiplexing and signaling functions, and one or more individualized front end media specific connections via front end interfaces connected to in-premises communication devices, said front end interfaces including a power line wire interface;

a premises adaptive gateway (PAG) including a generalized MAC layer having multiple common functions, a media specific layer providing specific functions and a physical connection layer having common media independent functions and having media-dependent front end interfaces connected to a wide area network (WAN); and a network layer connected in common to and shared by both the in-premises ICN and the PAG.

2. The distribution system of claim 1, wherein the front end interfaces of the ICN include a telephony wire interface.

3. The distribution system of claim 1, wherein the front end interfaces of the ICN include a coaxial cable interface.

4. The distribution system of claim 1, wherein the front end interfaces of the ICN include a wireless interface.

5. The distribution system of claim 1, wherein the front end interfaces of the ICN include a local area network (LAN) distribution system interconnecting the ICN and the PAG to in-premises telecommunication devices.

6. The distribution system of claim 1, wherein the modulation and multiplexing utilizes orthogonal frequency division multiplexing (OFDM).

7. The distribution system of claim 1, wherein the modulation and multiplexing utilizes direct sequence spread spectrum.

8. The distribution system of claim 1, wherein the modulation and multiplexing utilizes discrete multi-tone.

9. The distribution system of claim 1, wherein the modulation and multiplexing utilizes carrier-less amplitude phase (CAP) modulation.

10. The distribution system of claim 1, wherein the media dependent front end interfaces of the PAG include:

a twisted pair connection.

11. The distribution system of claim 1, wherein the media dependent front end interfaces of the PAG include:

a fiber connection.

12. The distribution system of claim 1, wherein the media dependent front end interfaces of the PAG include:

a wireless connection.

13. The distribution system of claim 1, wherein the media dependent front end interfaces of the PAG include:

a coaxial connection.

14. A distribution system for providing a customer premises local area network (LAN) with a multiple media telecommunication platform, where the multiple media in the premises are unified to create a single in-premises LAN across multiple physical media enabling distribution of services provided by a wide area network (WAN), the system comprising:

an in-premises communication node (ICN) on the in-premises LAN including a media access control (MAC) layer and a physical connection layer, the MAC layer including media specific controls and functions combined to provide common functionality, and the physical connection layer having:

common functions including synchronization, modulation and signaling; and media specific connections via one or more front end interfaces to in-premises communication devices, said interfaces including a power line wire interface;

a premises adaptive gateway (PAG) including a MAC layer for performing multiple common functions and being media dependent for specific functions, and a physical connection layer for media independent functions and having media dependent front end interfaces connected to a WAN; and a network layer connected in common with and being shared by the ICN LAN and the PAG WAN.

15. The distribution system of claim 14, wherein the multiple media share a modulating of signals by OFDM modulation.

16. The system of claim 1, wherein the multiple media distribution platform is a voice distribution platform.

17. The system of claim 1, wherein the multiple media distribution platform is a data distribution platform.

18. The system of claim 14, wherein the services provided by the WAN include at least one of a voice and a data service.

19. The system of claim 14, wherein the services provided by the WAN include video services.

20. The system of claim 14, wherein the front end interfaces of the ICN further includes at least one of a telephony wire interface and a coaxial cable interface.

* * * * *